US012762686B2

(12) United States Patent
Vah et al.

(10) Patent No.: US 12,762,686 B2
(45) Date of Patent: Oct. 13, 2026

(54) MACHINE-LEARNING BASED DEFECT IDENTIFICATION IN IMAGES OF COMPUTING DEVICES

(71) Applicant: Dell Products L.P., Round Rock, TX (US)

(72) Inventors: Jeffrey Scott Vah, Round Rock, TX (US); Ravi Shukla, Bangalore (IN); Aditi Saluja, Boston, MA (US); Cachelle Johnson-Lewis, Ludlow, MA (US)

(73) Assignee: Dell Products L.P., Round Rock, TX (US)

( * ) Notice: Subject to any disclaimer, the term of this patent is extended or adjusted under 35 U.S.C. 154(b) by 148 days.

(21) Appl. No.: 19/002,061

(22) Filed: Dec. 26, 2024

(65) Prior Publication Data

US 2026/0187775 A1 Jul. 2, 2026

(51) Int. Cl.
*G06T 7/00* (2017.01)

(52) U.S. Cl.
CPC .. *G06T 7/0004* (2013.01); *G06T 2207/20081* (2013.01); *G06T 2207/30141* (2013.01)

(58) Field of Classification Search
CPC ......... G06T 7/0004; G06T 2207/20081; G06T 2207/30141
See application file for complete search history.

(56) References Cited

U.S. PATENT DOCUMENTS

2025/0265700 A1* 8/2025 Chen ..................... G06T 7/0008

FOREIGN PATENT DOCUMENTS

CN 117745680 A * 3/2024
CN 118570169 A * 8/2024 ............. G06N 5/041

OTHER PUBLICATIONS

Cheung, Tsun-Hin, Ka-Chun Fung, Songjiang Lai, Kwan-Ho Lin, Vincent Ng, and Kin-Man Lam. "Automatic Prompt Generation and Grounding Object Detection for Zero-Shot Image Anomaly Detection." arXiv preprint arXiv:2411.19220 (2024). (Year: 2024).*

(Continued)

*Primary Examiner* — Carol W Chan
(74) *Attorney, Agent, or Firm* — Ryan, Mason & Lewis, LLP

(57) ABSTRACT

An apparatus comprises a processing device configured to obtain an image of a computing device, to generate a first data structure by processing the image to generate two or more image segments, to determine labels associated with designated defect types to be detected, and to apply the labels and the first data structure to a first machine learning model to generate a second data structure characterizing probabilities of the designated defect types being present in the image segments. The at least one processing device is further configured to determine input prompts based on the second data structure, and to apply the input prompts and the second data structure to a second machine learning model to generate a third data structure characterizing answers to the input prompts, and to identify, based on the third data structure, whether the computing device includes any defects of the designated defect types.

20 Claims, 10 Drawing Sheets

(56) References Cited

OTHER PUBLICATIONS

Yong, Gunwoo, Kahyun Jeon, Daeyoung Gil, and Ghang Lee. "Prompt engineering for zero-shot and few-shot defect detection and classification using a visual-language pretrained model." Computer-Aided Civil and Infrastructure Engineering 38, No. 11 (2023): 1536-1554. (Year: 2023).*

Open AI, "CLIP: Connecting Text and Images," https://openai.com/index/clip/, Jan. 5, 2021, 16 pages.

Hugging Face, "Visual Question Answering," https://huggingface.co/tasks/visual-question-answering, Accessed Nov. 5, 2024, 6 pages.

X. Pan et al., "Contrastive Language-Image Pre-Training with Knowledge Graphs," Proceedings of the 36th International Conference on Neural Information Processing Systems, Apr. 3, 2024, 16 pages.

A. Radford et al., "Learning Transferable Visual Models From Natural Language Supervision," arXiv:2103.00020v1, Feb. 26, 2021, 48 pages.

Y. Du et al., "A Survey of Vision-Language Pre-Trained Models," arXiv:2202.10936v2, Jul. 16, 2022, 8 pages.

A. M. Abu Ebayyeh et al., "A Review and Analysis of Automatic Optical Inspection and Quality Monitoring Methods in Electronics Industry," IEEE Access, vol. 8, Oct. 19, 2020, pp. 183192-183271.

Q. Wu et al., "Visual Question Answering: A Survey of Methods and Datasets," arXiv:1607.05910v1, Jul. 20, 2016, 25 pages.

* cited by examiner

410

['missing component or empty areas on PCB',
'burnt component with black marks on PCB',
'normal component with no defects']

415

Label probs for quadrant 1: [[0.0709 0.7744 0.1549]]
Label probs for quadrant 2: [[0.1279 0.847 0.02518]]
Label probs for quadrant 3: [[0.0945 0.495 0.4104]]
Label probs for quadrant 4: [[0.0901 0.3914 0.5186]]

420

Question: Where is the burnt component located in the image?
Predicted Answer: Middle

425

| **VQA Question** | **VQA Predicted Answer** |
| --- | --- |
| Is there a burnt component on the image? | Yes |
| Where is the burnt component located? | Middle |
| What is the count of burnt components in the image? | 1 |

FIG. 4B

510

['missing component or empty areas on PCB',
'scratches on a component of a PCB',
'burnt component on PCB',
'normal component with no defects']

515

Label probs for quadrant 1: [[0.0915 0.766 0.0639 0.0783]]
Label probs for quadrant 2: [[0.01354 0.9204 0.048 0.01822]]
Label probs for quadrant 3: [[0.3486 0.2147 0.1387 0.298 ]]
Label probs for quadrant 4: [[0.00872 0.3887 0.01906 0.5835 ]]

520

Question: Where is the scratched component located in the image?
Predicted Answer: Top

525

| **VQA Question** | **VQA Predicted Answer** |
|---|---|
| Is there a scratch on the image? | Yes |
| Where is the scratch located? | Top |
| What is the count of scratches the image? | 1 |

FIG. 5B

600

| CLIP MODEL LABELS | VQA QUESTIONS |
|---|---|
| SCRATCHES ON A COMPONENT OF A PCB | • HOW MANY SCRATCHES ARE ON THE PCB IMAGE?<br>• WHERE IS THE SCRATCH LOCATED ON THE PCB IMAGE?<br>• IS THERE A SCRATCH LOCATED ON THIS PCB IMAGE? |
| BURNT COMPONENT ON PCB | • WHERE IS THE BURNT COMPONENT LOCATED ON THE PCB?<br>• HOW MANY COMPONENTS HAVE BEEN BURNT? |

FIG. 6

MACHINE-LEARNING BASED DEFECT IDENTIFICATION IN IMAGES OF COMPUTING DEVICES

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices.

SUMMARY

Illustrative embodiments of the present disclosure provide techniques for machine learning-based defect identification in images of computing devices.

In one embodiment, an apparatus comprises at least one processing device comprising a processor coupled to a memory. The at least one processing device is configured to obtain an image of at least a portion of a computing device, to process the image of the portion of the computing device to generate two or more image segments thereof for inclusion in a first data structure, and to determine a set of one or more labels to be provided as input to a first machine learning model, the one or more labels being associated with one or more designated defect types to be detected. The at least one processing device is also configured to apply the determined set of one or more labels and at least a portion of the first data structure to the first machine learning model to determine, for inclusion in a second data structure, probabilities of the one or more designated defect types being present in each of the two or more image segments of the portion of the computing device. The at least one processing device is further configured to determine, based at least in part on at least a portion of the second data structure, one or more input prompts for a second machine learning model, and to apply the determined one or more input prompts and at least a portion of the second data structure to the second machine learning model to generate answers to the determined one or more input prompts. The at least one processing device is further configured to identify, based at least in part on the generated answers to the determined one or more input prompts, whether the portion of the computing device includes any defects of the one or more designated defect types.

These and other illustrative embodiments include, without limitation, methods, apparatus, networks, systems and processor-readable storage media.

BRIEF DESCRIPTION OF THE DRAWINGS

FIGS. 4A and 4B show an example of sequential application of a contrastive language-image pretraining model and a visual question answering model for defect identification in an image of a printed circuit board in an illustrative embodiment.

FIGS. 5A and 5B show another example of sequential application of a contrastive language-image pretraining model and a visual question answering model for defect identification in an image of a printed circuit board in an illustrative embodiment.

FIG. 6 shows a table of zero-shot labels for a contrastive language-image pretraining model and prompts for a visual question answering model for defect identification in images of printed circuit boards in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
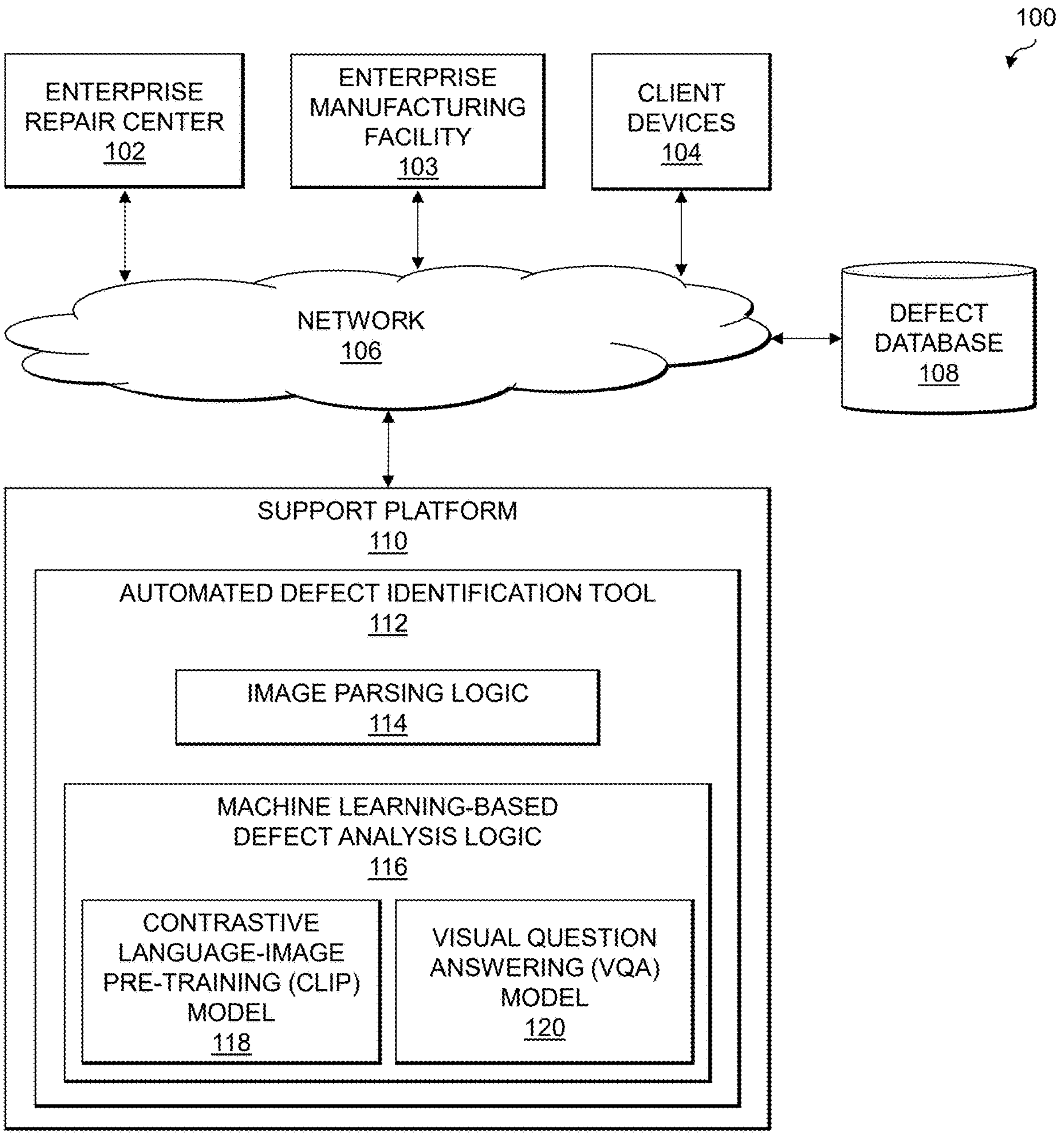
FIG. 1 is a block diagram of an information processing system configured for machine learning-based defect identification in images of computing devices in an illustrative embodiment.

FIG. 1 shows an information processing system 100 configured in accordance with an illustrative embodiment. The information processing system 100 is assumed to be built on at least one processing platform and provides functionality for machine learning-based defect identification in images of computing devices. The information processing system 100 includes an enterprise repair center 102, an enterprise manufacturing facility 103 and one or more client devices 104 that are coupled to a network 106. Also coupled to the network 106 is a defect database 108 and a support platform 110. The support platform 110 in the FIG. 1 embodiment is configured to provide support services for the enterprise repair center 102, the enterprise manufacturing facility 103 and/or the client devices 104. Such support services may include identification of defects utilizing automated defect identification tool 112. Although shown in FIG. 1 as being implemented external to the enterprise repair center 102, the enterprise manufacturing facility 103 and the client devices 104, in other embodiments the support platform 110 or instances thereof may be implemented internal to one or more of the enterprise repair center 102, the enterprise manufacturing facility 103 and/or the client devices 104.

In some embodiments, the support platform 110 is used for providing supports services for one or more enterprises (e.g., operating the enterprise repair center 102, the enterprise manufacturing facility 103 and/or an enterprise system such as an information technology (IT) infrastructure including the client devices 104). For example, an enterprise may subscribe to or otherwise utilize the support platform 110 to perform automated defect identification (e.g., for products or components/parts thereof, such as printed circuit boards (PCBs) of computing devices) that are to be repaired (e.g., at the enterprise repair center 102), are manufactured (e.g., at the enterprise manufacturing facility 103) or are operating in an IT infrastructure or deployed in the field (e.g., the client devices 104). As used herein, the term "enterprise system" is intended to be construed broadly to include any group of systems or other computing devices. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The enterprise repair center 102 is assumed to be operated by an enterprise that offers repair services for one or more products, such as computing devices. In some cases, the enterprise repair center 102 is operated by a vendor of the products being serviced. In other cases, the enterprise repair center 102 may be operated by a third-party that provides repair services for products produced by one or more multiple vendors. As part of such repair services, products to be repaired are analyzed for defects. For example, PCBs of computing devices or components thereof may be analyzed for defects as part of troubleshooting and remediation of issues occurring on the computing devices. The enterprise repair center 102 may take images of such PCBs or other components of the computing devices, with such images being provided to the support platform 110 for automated defect analysis utilizing the automated defect identification tool 112.

The enterprise manufacturing facility 103 is assumed to be operated by an enterprise (e.g., a vendor) that manufactures products. The enterprise manufacturing facility 103, for quality control, may seek to perform defect analysis for products manufactured therein. To do so, the enterprise manufacturing facility 103 may take images of the manufactured products or parts of components thereof (e.g., PCBs), and provide such images to the support platform 110 for automated defect analysis utilizing the automated defect identification tool 112.

The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may implement virtualized computing resources, such as virtual machines (VMs), containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art. In some embodiments, the client devices 104 comprise assets of an IT infrastructure operated by an enterprise, and the enterprise repair center 102 is configured to provide support services for such assets using the support platform 110.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The defect database 108 is configured to store and record information that is used by the automated defect identification tool 112 for performing defect identification. Such information may include, for example, machine learning models utilized in the automated defect identification process, images of products, parts or components which have been or which are to be analyzed for defects, etc. The defect database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the enterprise repair center 102, the enterprise manufacturing facility 103, the client devices 104, the defect database 108, the support platform 110 and other related systems and devices not explicitly shown.

The support platform 110, in some embodiments, may be operated by a hardware vendor that manufactures (e.g., utilizing enterprise manufacturing facility 103) and sells computing devices (e.g., desktops, laptops, tablets, smartphones, etc.), and the client devices 104 may represent computing devices sold by that hardware vendor. The hardware vendor operating the support platform 110 may also operate the enterprise repair center 102, where computing devices sold by the hardware vendor may be sent for servicing (e.g., troubleshooting and remediation of issues encountered thereon). The support platform 110, however, is not required to be operated by a hardware vendor that manufactures and sells computing devices. Instead, the support platform 110 may be offered as a service to provide support for computing devices that are sold by any number of hardware vendors. The client devices 104 may subscribe to the support platform 110, so as to provide support including troubleshooting of hardware and software components of the client devices 104. Various other examples are possible.

In some embodiments, the enterprise repair center 102, the enterprise manufacturing facility 103 and/or the client devices 104 may implement host agents that are configured for automated transmission of information in conjunction with service requests that are submitted to the support platform 110. Such information may include device images for a computing device (or one or more parts or components thereof, such as one or more PCBs) to be serviced. Such host agents may also be configured to automatically receive from the support platform 110 various support information (e.g., details of troubleshooting and repair actions performed on or for the client devices 104, support services that are available to the client devices 104, etc.). The host agents may comprise support software that is installed on the client devices 104.

It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements the automated defect identification tool 112. The automated defect identification tool 112 comprises image parsing logic 114 and machine learning-based defect analysis logic 116 (which is an example of a machine learning system implementing one or more machine learning models for defect identification in images of computing devices or parts or components thereof). The support platform 110 is configured to identify servicing requests (e.g., submitted by users of the client devices 104 for servicing of computing devices, which may be the client devices 104 themselves, computing or other devices or parts or components thereof which are being serviced at the enterprise repair center 102, computing or other devices or parts or components thereof which are manufactured at the enterprise manufacturing facility 103, etc.). Such servicing requests are assumed to include images of the computing devices (or one or more parts or components thereof, such as PCBs) to be serviced. The image parsing logic 114 is configured to obtain and analyze such images and prepare them for processing by the machine learning-based defect analysis logic 116. This may include, for example, segmenting the images, where the size of the segments may be selected based on the type or types of defects which may be present (e.g., scratches, burns, missing components, etc.) and are to be detected. The machine learning-based defect analysis logic 116 is configured to process the image segments through sequential application of a contrastive language-image pre-training (CLIP) model 118 and a visual question answering (VQA) model 120. The CLIP model 118 implements zero-shot learning (ZSL) and determines whether the image segments are associated with different labels (e.g., corresponding to different defect types). The output of the CLIP model 118 is used as an input to the VQA model 120, along with questions related to identified defects (e.g., whether there are any identified defects, the types of any identified defects, the locations of any identified defects, the count of each type of defect identified, etc.).

At least portions of the automated defect identification tool 112, the image parsing logic 114, the machine learning-based defect analysis logic 116, the CLIP model 118 and the VQA model 120 may be implemented at least in part in the form of software that is stored in memory and executed by a processor.

It is to be appreciated that the particular arrangement of the enterprise repair center 102, the enterprise manufacturing facility 103, the client devices 104, the defect database 108 and the support platform 110 illustrated in the FIG. 1 embodiment is presented by way of example only, and alternative arrangements can be used in other embodiments. As discussed above, for example, the support platform 110 (or portions of components thereof, such as one or more of the automated defect identification tool 112, the image parsing logic 114, the machine learning-based defect analysis logic 116, the CLIP model 118 and the VQA model 120) may in some embodiments be implemented internal to one or more of the enterprise repair center 102, the enterprise manufacturing facility 103 and/or the client devices 104.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The enterprise repair center 102, the enterprise manufacturing facility 103, the client devices 104, the defect database 108 and the support platform 110 or components thereof (e.g., the automated defect identification tool 112, the image parsing logic 114, the machine learning-based defect analysis logic 116, the CLIP model 118 and the VQA model 120) may be implemented on respective distinct processing platforms, although numerous other arrangements are possible. For example, in some embodiments at least portions of the support platform 110 and one or more of the enterprise repair center 102, the enterprise manufacturing facility 103, the client devices 104 and/or the defect database 108 are implemented on the same processing platform. A given one of the client devices 104 can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the enterprise repair center 102, the enterprise manufacturing facility 103, the client devices 104, the defect database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 7 and 8.

It is to be understood that the particular set of elements shown in FIG. 1 for machine learning-based defect identification in images of computing devices is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for machine learning-based defect identification in images of computing devices will now be described in more detail with reference to the flow diagram of FIG. 2. It is to be understood that this particular process is only an example, and that additional or alternative processes for machine learning-based defect identification in images of computing devices may be used in other embodiments.

In this embodiment, the process includes steps 200 through 212. These steps are assumed to be performed by the support platform 110 utilizing the automated defect identification tool 112, the image parsing logic 114, the machine learning-based defect analysis logic 116, the CLIP model 118 and the VQA model 120. The process begins with step 200, obtaining an image of at least a portion of a computing device. The portion of the computing device may comprise one or more hardware components of the computing device, such as a printed circuit board (PCB).

In step 202, the image of the portion of the computing device is processed to generate two or more segments thereof for inclusion in a first data structure. A set of one or more labels to be provided as input to a first machine learning model is determined in step 204. The one or more labels are associated with one or more designated defect types to be detected. Where the portion of the computing device is a PCB, the one or more designated defect types may comprise at least one of: scratches on components of the PCB; burn marks on components of the PCB; and missing components on the PCB and other defect types commonly detected but not provided as an example previously mentioned. In some embodiments, the segment size utilized in step 202 is dynamically selected based at least in part on the one or more designated defect types to be detected.

The determined set of one or more labels and at least a portion of the first data structure are applied to the first machine learning model to determine, for inclusion in a second data structure, probabilities of the one or more designated defect types being present in each of the two or more image segments of the portion of the computing device in step 206. The first machine learning model may comprise a CLIP model. The CLIP model may utilize zero-shot learning with the determined set of one or more labels. The CLIP model may be fine-tuned utilizing a database of images of portions of computing devices having defects of the one or more designated defect types.

In step 208, one or more input prompts for a second machine learning model are determined based at least in part on at least a portion of the second data structure. Determining the one or more input prompts in step 208 may comprise selecting, from a set of possible input prompts, a subset of the set of possible input prompts which are associated with at least one of the one or more designated defect types having at least a threshold probability of being present in at least one of the two or more image segments of the portion of the computing device. The selected subset of the set of possible input prompts may include: at least one input prompt associated with determining locations of one or more defects of the at least one designated defect type having at least the threshold probability of being present in at least one of the two or more image segments of the portion of the computing device; and at least one input prompt associated with determining a count of defects of the at least one designated defect type having at least the threshold probability of being present in at least one of the two or more image segments of the portion of the computing device. The second machine learning model may be a VQA model.

The determined one or more input prompts and at least a portion of the second data structure are applied to the second machine learning model in step 210 to generate answers to the determined one or more input prompts. The FIG. 2 process continues with identifying, in step 212, whether the portion of the computing device includes any defects of the one or more designated defect types based at least in part on the generated answers to the determined one or more input prompts.

It should be noted that the term "data structure" as used herein is intended to be broadly construed. A data structure, such as any single one of or combination of the first and second data structures referred to above, may provide a portion of a larger data structure, or any one of or combination of the first and second data structures may be combinations of multiple smaller data structures. Therefore, the first and second data structures referred to above may be different parts of a same overall data structure, or one or more of the first and second data structures could be made up of multiple smaller data structures. The data structures may include tables, vectors, embeddings, or various other data structures. In some embodiments, the data structures are specifically formatted or generated such that they are suitable for use as at least one of an input to and an output from a machine learning model. It should further be appreciated that "generating" a data structure may encompass, for example, populating an existing or previously-created data structure with one or more data items.

Figure 2:
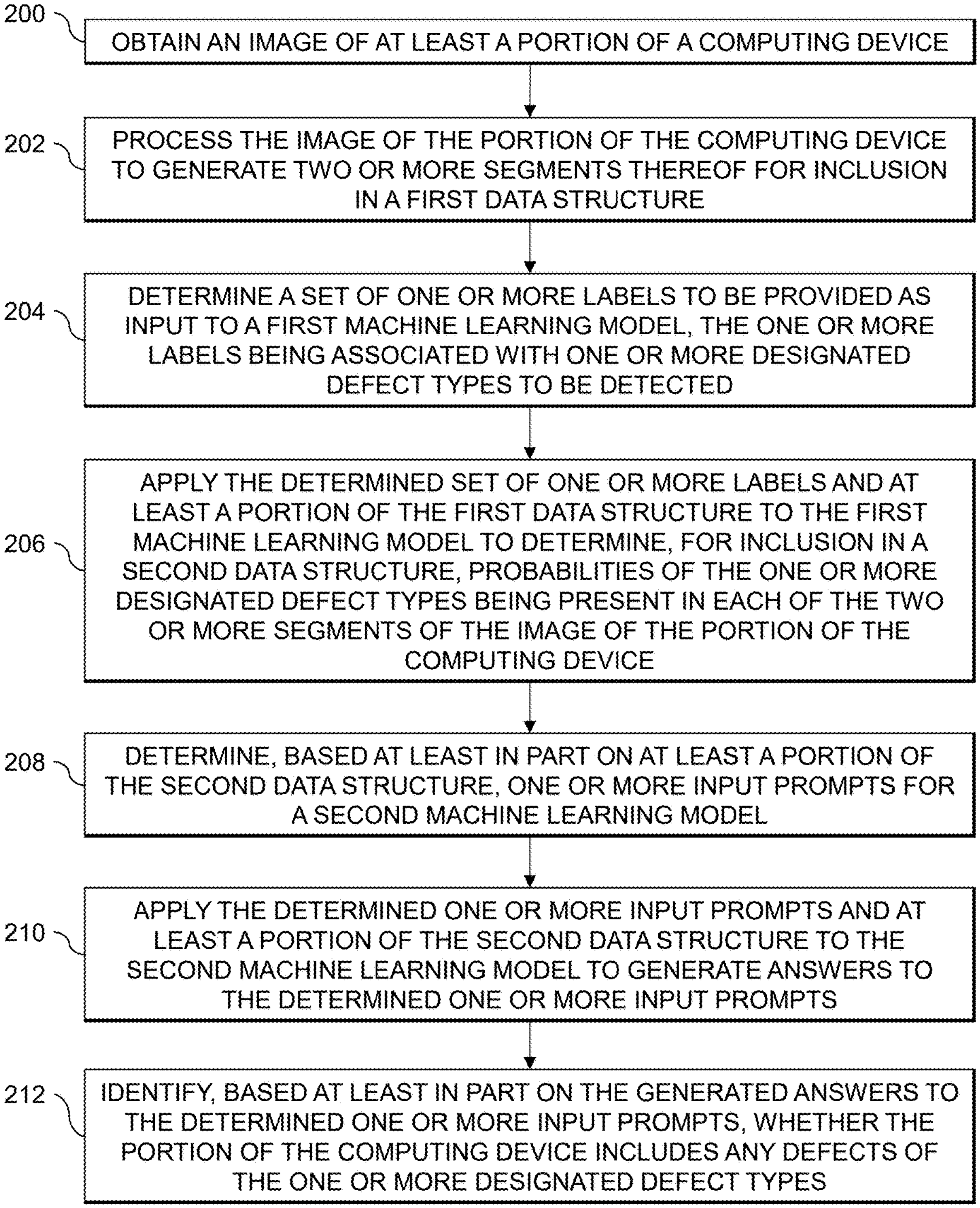
FIG. 2 is a flow diagram of an exemplary process for machine learning-based defect identification in images of computing devices in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, multiple instances of the process can be performed in parallel with one another, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

In printed circuit board (PCB) manufacturing and repair inspection processes, there are different methods of defect inspection, including (1) automated optical inspection (AOI) systems and (2) manual visual mechanical inspections and screening by skilled technicians to identify parts quality issues prior to repair. Defect inspections using AOI, such as in new parts manufacturing, can result in high yields (e.g., about 98% or greater). However, image processing of fast-moving parts on a conveyor belt is error-prone, resulting in incorrect classification of defect types and labeling errors. When humans perform manual defect inspections, subjectivity varies across global regions and skill levels, resulting in process inconsistencies, errors and missed defect locations.

A summation of defects found during inspections can result in PCB parts being incorrectly classified as "unrepairable," and thus such parts may be inadvertently dispositioned as scrap or waste. Additionally, inspection processing errors during inspections may extend debugging and repair cycles for complex, hard-to-repair (HTR) parts. In both cases, inspection errors can accumulate to reduce repair and manufacturing yields (e.g., by 1-3% or more). Further, the quality of workmanship can cause latent part failures which impacts customer or other user satisfaction.

Illustrative embodiments provide technical solutions for machine-learning based automated defect identification. The technical solutions are advantageously able to minimize errors which would be accumulated by human and automated optical inspection processes. In some embodiments, the technical solutions link the output of a Contrastive Language-Image Pre-training (CLIP) model to questions input to a visual question answering (VQA) model to automate defect identification and defect counts during PCB parts visual inspection processes. The PCB parts visual inspection processes can be applied during manufacturing or repair processes. The technical solutions, in some embodiments, rely only on segmented images, defect counts and probability scores, and failure mode classification to enable repair guidance.

The technical solutions in some embodiments are advantageously able to perform defect inspection for very densely populated PCBs through a sequential application of multiple machine learning models (e.g., a sequential application of a CLIP and VQA models). Questions for the VQA model are generated dynamically based on zero-shot labels (applied to an input image or one or more segments thereof) that exceed threshold scores generated by the CLIP model. Image segment size may be determined dynamically based on the probable or likely size of defects. It should be noted that while various embodiments are described with respect to defect identification for PCBs, the technical solutions described herein may be applied in other domains and use cases by using suitable labels for the CLIP model and corresponding questions for the VQA model.

When errors are made during defect inspections, manufacturing and service parties, including third-party repair centers, may inadvertently send "repairable" parts to scrap for disposal. Additionally, the debugging of complex HTR PCB parts typically exceeds time constraints, also resulting in scrap dispositions. The technical solutions described herein are able to automate the visual inspection of PCBs (e.g., during new manufacturing, repair and servicing, etc.) with CLIP and VQA models. The technical solutions are advantageously able to simplify image processing by reducing the need for object detection models (e.g., including processing for gathering pictures to train models, labeling thousands of images, etc.).

A process flow for machine-learning based automated defect identification includes obtaining an image of a MB or other PCB or part to be analyzed, and dividing the image into segments (e.g., N equal size segments $S_1 \ldots S_N$, each of 100×100 pixels or some other designated size). During the division of the image into segments, the segment size may be determined dynamically based on the probable size of the defects (e.g., as different types of defects may have different expected or probable sizes, as discussed in further detail below). For each of the segments, a CLIP model is applied to generate an output. The output of the CLIP model is then provided as input applied to a VQA model.

The CLIP model utilizes zero-shot learning (ZSL). Zero-shot labels are pre-populated by domain experts, who provide relevant natural language phrases during the labeling process, which is a one-time exercise. Examples of labels include ['a photo of a missing component on a PCB', 'a photo of a damaged component on a PCB']. The VQA model utilizes questions which are recommended by domain experts, such as "How many components are missing on the PCB?". The questions for the VQA model are generated dynamically based on the zero-shot labels (e.g., applied to the image) which cross a designated threshold score. The threshold score may be determined based on a zero-shot score of each label, where if the score for a particular label $l_i$ for a particular segment exceeds the threshold score, then that label $l_i$ is assigned to that segment. Multiple labels can be assigned to an image segment. If a label has a high score, it means that the image segment is related to that label. The image segments, with their assigned labels, are provided as input to the VQA model along with questions (e.g., which are predetermined as discussed above), such as questions regarding the counts and location of different types of defects or other issues present in the image segments. Examples of questions related to defects or other issues in PCBs include: "How many components are missing on this PCB?" and "Where, in the image, are the scratches located on the PCB?". Based on the output of the CLIP model and the VQA model and a threshold score, final labels along with counts, locations or other desired information associated with the labels are assigned to the image or segments thereof. For fine-tuning of the CLIP and VQA models, domain expert opinion may be used to confirm results.

The technical solutions described herein can be utilized in various use cases, including multiple component failure dispositions (e.g., missing, tampering, fraud, burnt, damage, broken, wrong, etc.), locating and labeling of defects observed during parts inspection, image processing approaches resulting in parts classifications (e.g., repairable or unrepairable), etc. Conventional approaches, such as existing manufacturing AOI systems, regularly capture part images to perform part defect inspections. Such approaches, however, do not utilize a sequential application of machine learning models (e.g., sequential application of CLIP and VQA models) to perform part defect inspections.

Systems deploying object detection models to identify defects in finished goods or parts (e.g., PCBs, other hardware components of IT assets) require gathering statistically significant quantities of qualified part images. Because certain parts, like PCBs, are densely populated, object detection models would typically require a lengthy and expensive process to train and label thousands of images. The technical solutions described herein address this training challenge by replacing the need for object detection models with VQA and CLIP zero-shot models (which are pre-trained).

Errors may occur in AOI inspections due to image processing time, lighting conditions, conveyor belt speed, and image quality. In manual human-performed inspections, errors are often a result of or due to subjectivity and varying global operator skill levels. As errors are made during defect inspections, manufacturing and service centers, including third-party repair centers, may inadvertently send "repairable" parts to scrap for disposal. Additionally, the debugging of complex HTR parts typically exceeds time constraints, also resulting in scrap dispositions. The technical solutions described herein can address these and other technical challenges, through implementing a more efficient and effective approach for the identification of part (e.g., PCB) defects using CLIP and VQA models.

In some embodiments, automated defect detection for PCBs or other hardware parts or components of IT assets is achieved using neural networks including a CLIP and a VQA model. In the description below, it is assumed that the defect detection is performed for PCBs, though as discussed elsewhere herein embodiments are not limited solely to use in detecting defects or other issues in PCBs. Defect detection may also be performed for other hardware parts or components of IT assets or other devices.

Figure 3:
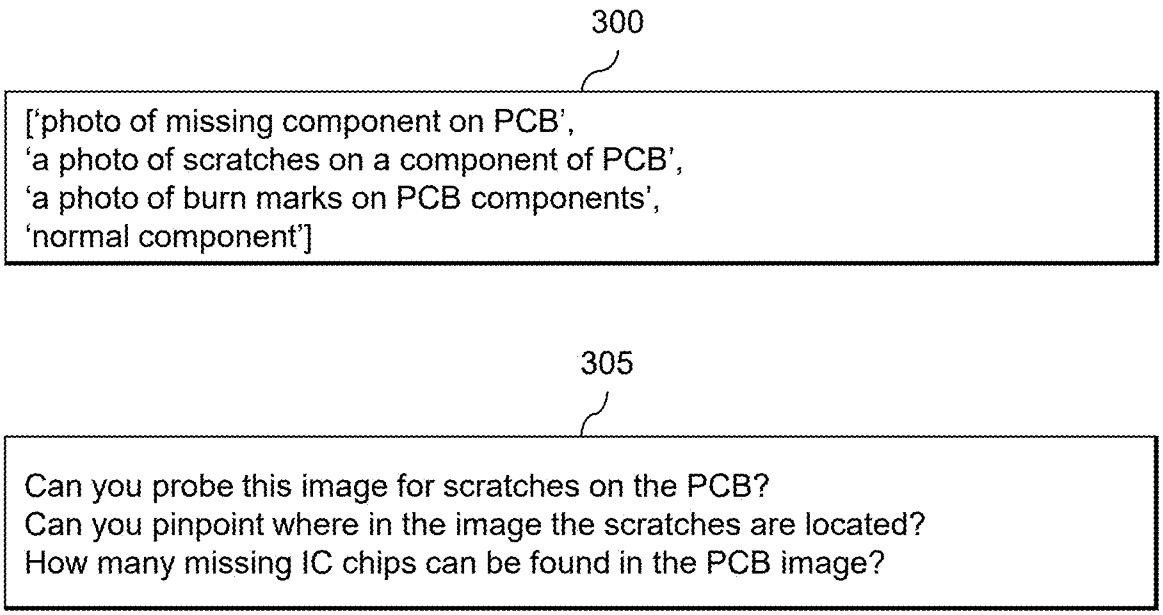
FIG. 3 shows examples of zero-shot labels for a contrastive language-image pretraining model and prompts for a visual question answering model in an illustrative embodiment.

To begin, an image of a PCB is captured (e.g., at a repair line, in the field, etc.). The image is divided or split into segments, where the segment size (e.g., n×n pixels) is based on defect size. Here, n is the probable size of a defect, such as burn marks, scratches on integrated circuit (IC) chips, missing components/fraud, etc. CLIP zero-shot learning is then performed. The CLIP model is used with zero-shot labels, such as the labels 300 shown in FIG. 3. The CLIP model assigns a probability to each [n×n] segment of the image. Since a zero-shot model is used, a high threshold score may be set (e.g., ~0.8) to correctly label the image segments. Based on the scores assigned by the CLIP model, a second layer validation is performed using a VQA model. The VQA model may use various questions, such as the questions 305 shown in FIG. 3. The VQA model confirms the answer, and probes where in the image that defects are located and/or the counts of the defects in the image. A repair technician or field engineer may confirm the identification done by the model, thereby making them more efficient and reducing the time spent in the whole evaluation. The CLIP model may optionally be fine-tuned on a database of PCB images with defects of various kinds, improving the labeling process of the model.

Example implementations will now be described with respect to use of the technical solutions described herein for inspecting PCB images with defects such as scratches and burn marks.

Figure 4A:
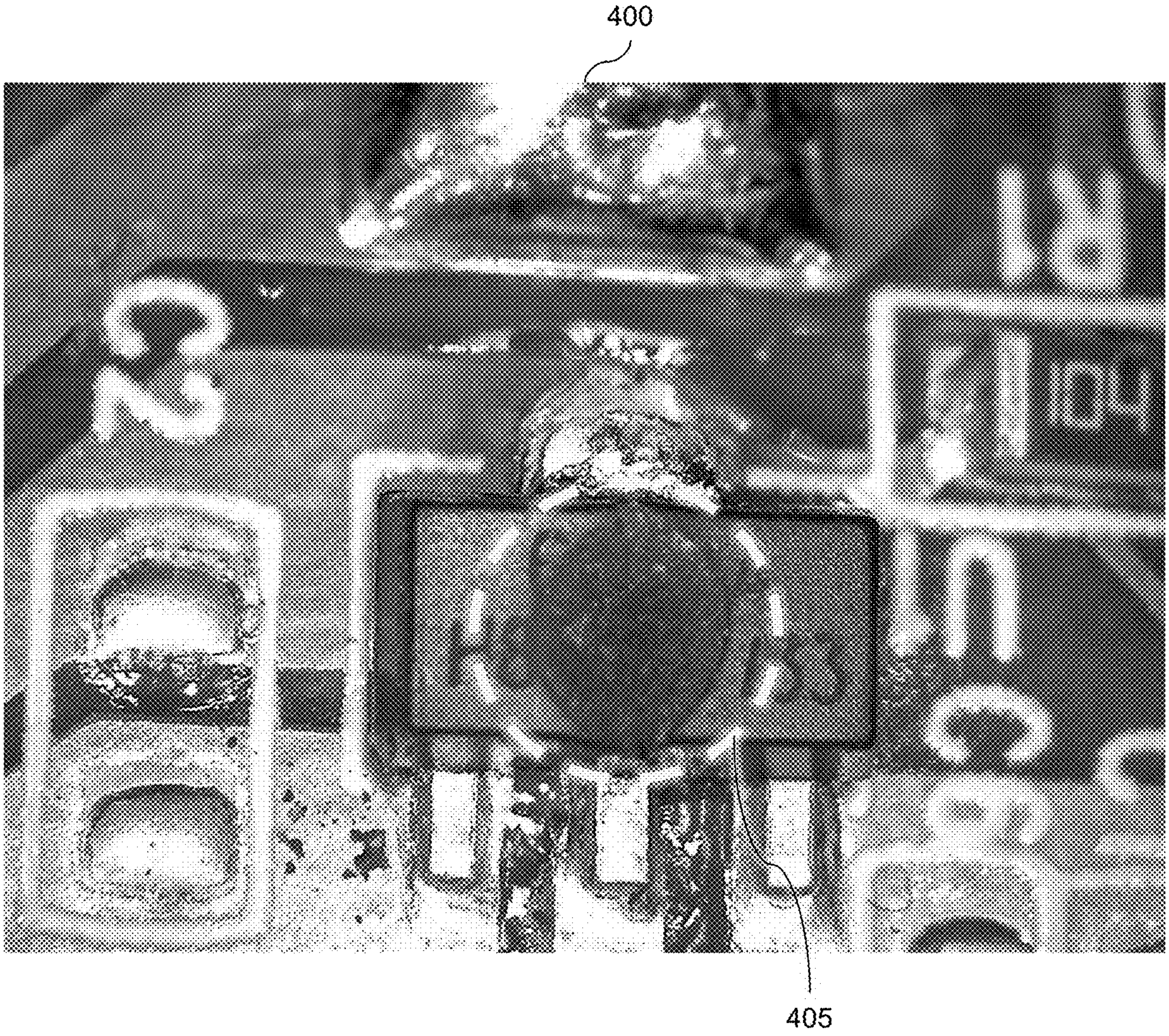

FIG. 4A shows a PCB image 400, having burn mark 405. In this example, the PCB image 400 is divided into four segments (quadrants), and the CLIP model is run to determine the probability of burn marks in each quadrant. FIG. 4B shows the labels 410 used for the CLIP model, and the results or output 415 of the CLIP model. As discussed above, since a zero-shot model is used, a high threshold may be desired. In this example, the threshold is set to 0.8, finding that the second of the labels 410 ('burnt component with black marks on PCB') in quadrant 2 has the maximum likelihood. It should be noted, however, that other thresholds may be set as desired for a particular implementation and false positive (FP)/false negative (FN) tolerance. The output 415 is used to validate, with the VQA model, where in the PCB image 400 that the defect is located. In this example, the VQA model can use input prompts to locate where the burnt component is located on the PCB shown in the PCB image 400. FIG. 4B shows the application 420 of the VQA model, including an input question (e.g., "Where is the burn component located in the image?") and the predicted answer (e.g., "Middle"). FIG. 4B also shows a table 425, illustrating multiple inputs given as prompts to the VQA and the model results (predicted answers).

Figure 5A:
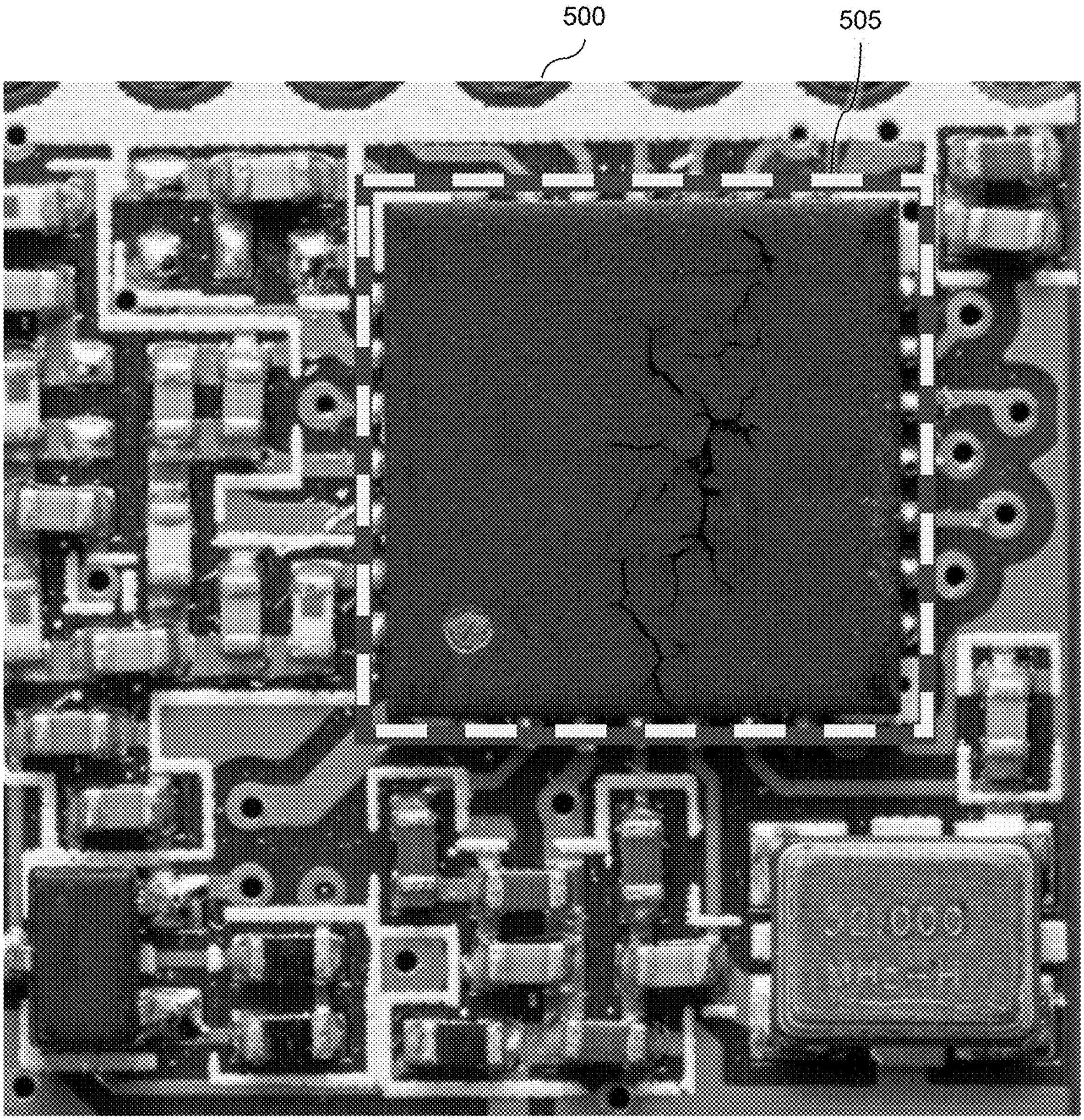

FIG. 5A shows a PCB image 500, having scratch 505. In this example, the PCB image 500 is again divided into four segments (quadrants), and the CLIP model is run to determine the probability of scratches (and other defects) in each quadrant. FIG. 5B shows the labels 510 used for the CLIP model, and the results or output 515 of the CLIP model. As discussed above, since a zero-shot model is used, a high threshold may be desired. In this example, the threshold is again set to 0.8, finding that the second of the labels 510 ('scratches on a component of a PCB') in quadrant 2 has the maximum likelihood. It should be noted, however, that other thresholds may be set as desired for a particular implementation and FP/FN tolerance. The output 515 is used to validate, with the VQA model, where in the PCB image 500 that the defect is located. In this example, the VQA model can use input prompts to locate where the component with scratches is located on the PCB shown in the PCB image 500. FIG. 5B shows the application 520 of the VQA model, including an input question (e.g., "Where is the scratched component located in the image?") and the predicted answer (e.g., "Top"). FIG. 5B also shows a table 525, illustrating multiple inputs given as prompts to the VQA and the model results (predicted answers).

FIG. 6 shows a table 600, summarizing zero-shot labels for the CLIP model along with corresponding questions for the VQA model. Here, it is assumed that two types of defects are being searched for (e.g., scratches on a component of a PCB and burnt components on a PCB). The VQA questions for the CLIP labels seek to provide useful information, such as: whether there are any defects in the PCB image; if there are any defects in the PCB image, where the defects are located; and counts of defects of the different defect types. The sequential use of the CLIP and VQA models for automated defect detection facilitates automated inspection of PCBs, saving precious man-hours of repair technicians and enabling repair technicians to more efficiently confirm defects (e.g., through output that provides localization information for defects).

As PCB part component sizes continue to shrink, the value of the technical solutions described herein will also increase by helping repair technicians to spot defects with a high degree of confidence. Further, the CLIP model may optionally be fine-tuned on shrinking component and defect sizes, which can increase the effectiveness of defect identification of smaller components.

The technical solutions described herein provide a novel approach for automated defect identification, including for hardware devices or components thereof such as densely populated PCBs, through a sequential application of CLIP and VQA models. The questions for the VQA model are generated dynamically based on zero-shot labels (applied to the image) that must exceed threshold scores generated by the CLIP model. The image segment size is determined dynamically based on the probable or likely size of different types of defects. Further, the technical solutions described herein can be applied in various use case scenarios and domains using suitable zero-shot labels for the CLIP model and corresponding questions for the VQA model.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based defect identification in images of computing devices will now be described in greater detail with reference to FIGS. 7 and 8. Although described in the context of system 100, these platforms may also be used to implement at least portions of other information processing systems in other embodiments.

Figure 7:
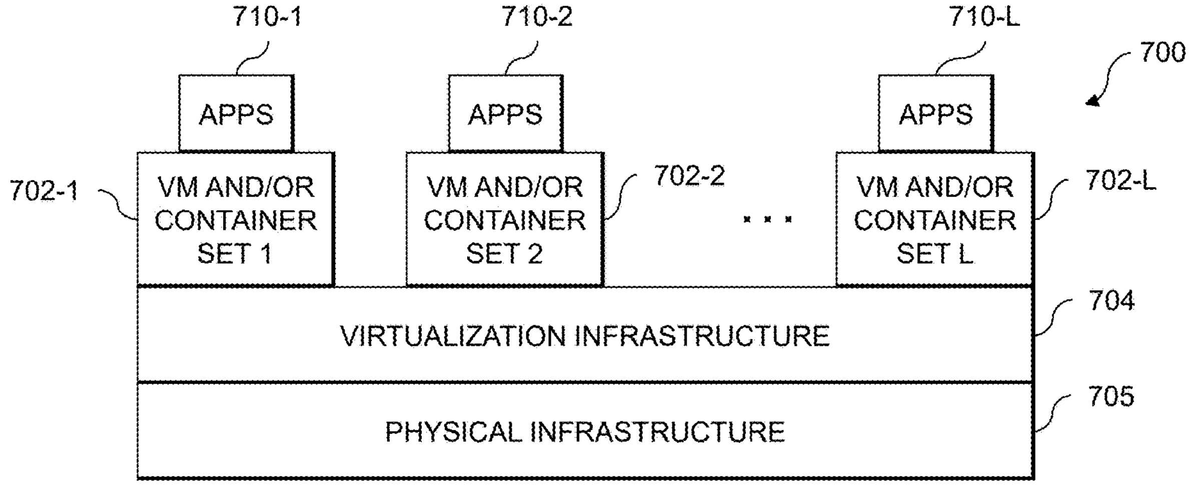
FIGS. 7 and 8 show examples of processing platforms that may be utilized to implement at least a portion of an information processing system in illustrative embodiments.
Figure 8:
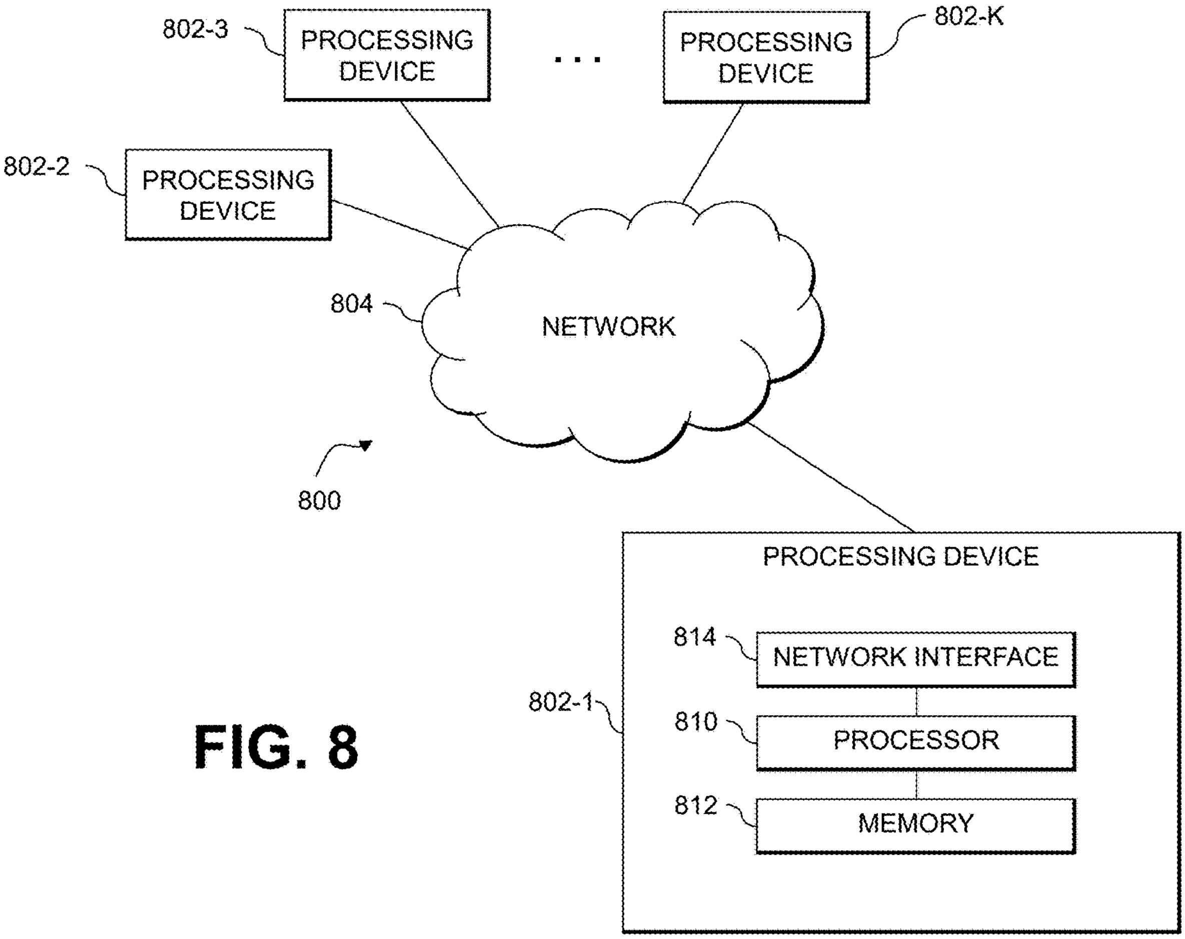

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), a neural processing unit (NPU), a data processing unit (DPU), a System-On-Chip (SOC) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based defect identification in images of computing devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, images, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to obtain an image of at least a portion of a computing device;

to process the image of the portion of the computing device to generate two or more segments thereof for inclusion in a first data structure;

to determine a set of one or more labels to be provided as input to a first machine learning model, the one or more labels being associated with one or more designated defect types to be detected;

to apply the determined set of one or more labels and at least a portion of the first data structure to the first machine learning model to determine, for inclusion in a second data structure, probabilities of the one or more designated defect types being present in each of the two or more segments of the image of the portion of the computing device;

to determine, based at least in part on at least a portion of the second data structure, one or more input prompts for a second machine learning model;

to apply the determined one or more input prompts and at least a portion of the second data structure to the second machine learning model to generate answers to the determined one or more input prompts; and to identify, based at least in part on the generated answers to the determined one or more input prompts, whether the portion of the computing device includes any defects of the one or more designated defect types.

2. The apparatus of claim 1 wherein the portion of the computing device comprises one or more hardware components of the computing device.

3. The apparatus of claim 1 wherein the portion of the computing device comprises a printed circuit board.

4. The apparatus of claim 3 wherein the one or more designated defect types comprises scratches on components of the printed circuit board.

5. The apparatus of claim 3 wherein the one or more designated defect types comprises burn marks on components of the printed circuit board.

6. The apparatus of claim 3 wherein the one or more designated defect types comprises missing components on the printed circuit board.

7. The apparatus of claim 1 wherein a segment size of the two or more segments of the image of the portion of the computing device is dynamically selected based at least in part on the one or more designated defect types to be detected.

8. The apparatus of claim 1 wherein the first machine learning model comprises a Contrastive Language-Image Pre-training (CLIP) model.

9. The apparatus of claim 8 wherein the CLIP model utilizes zero-shot learning with the determined set of one or more labels.

10. The apparatus of claim 8 wherein the CLIP model is fine-tuned utilizing a database of images of portions of computing devices having defects of the one or more designated defect types.

11. The apparatus of claim 1 wherein determining the one or more input prompts comprises selecting, from a set of possible input prompts, a subset of the set of possible input prompts which are associated with at least one of the one or more designated defect types having at least a threshold probability of being present in at least one of the two or more segments of the image of the portion of the computing device.

12. The apparatus of claim 11 wherein the selected subset of the set of possible input prompts comprises at least one input prompt associated with determining locations of one or more defects of the at least one designated defect type having at least the threshold probability of being present in at least one of the two or more segments of the image of the portion of the computing device.

13. The apparatus of claim 11 wherein the selected subset of the set of possible input prompts comprises at least one input prompt associated with determining a count of defects of the at least one designated defect type having at least the threshold probability of being present in at least one of the two or more segments of the image of the portion of the computing device.

14. The apparatus of claim 1 wherein the second machine learning model comprises a Visual Question Answering (VQA) model.

15. A computer program product comprising a non-transitory processor-readable storage medium having stored therein program code of one or more software programs, wherein the program code when executed by at least one processing device causes the at least one processing device:

to obtain an image of at least a portion of a computing device;

to process the image of the portion of the computing device to generate two or more segments thereof for inclusion in a first data structure;

to determine a set of one or more labels to be provided as input to a first machine learning model, the one or more labels being associated with one or more designated defect types to be detected;

to apply the determined set of one or more labels and at least a portion of the first data structure to the first machine learning model to determine, for inclusion in a second data structure, probabilities of the one or more designated defect types being present in each of the two or more segments of the image of the portion of the computing device;

to determine, based at least in part on at least a portion of the second data structure, one or more input prompts for a second machine learning model;

to apply the determined one or more input prompts and at least a portion of the second data structure to the second machine learning model to generate answers to the determined one or more input prompts; and to identify, based at least in part on the generated answers to the determined one or more input prompts, whether the portion of the computing device includes any defects of the one or more designated defect types.

16. The computer program product of claim 15 wherein a segment size of the two or more segments of the image of the portion of the computing device is dynamically selected based at least in part on the one or more designated defect types to be detected.

17. The computer program product of claim 15 wherein the first machine learning model comprises a Contrastive Language-Image Pre-training (CLIP) model and the second machine learning model comprises a Visual Question Answering (VQA) model.

18. A method comprising:

obtaining an image of at least a portion of a computing device;

processing the image of the portion of the computing device to generate two or more segments thereof for inclusion in a first data structure;

determining a set of one or more labels to be provided as input to a first machine learning model, the one or more labels being associated with one or more designated defect types to be detected;

applying the determined set of one or more labels and at least a portion of the first data structure to the first machine learning model to determine, for inclusion in a second data structure, probabilities of the one or more designated defect types being present in each of the two or more segments of the image of the portion of the computing device;

determining, based at least in part on at least a portion of the second data structure, one or more input prompts for a second machine learning model;

applying the determined one or more input prompts and at least a portion of the second data structure to the second machine learning model to generate answers to the determined one or more input prompts; and identifying, based at least in part on the generated answers to the determined one or more input prompts, whether the portion of the computing device includes any defects of the one or more designated defect types;

wherein the method is performed by at least one processing device comprising a processor coupled to a memory.

19. The method of claim 18 wherein a segment size of the two or more segments of the image of the portion of the computing device is dynamically selected based at least in part on the one or more designated defect types to be detected.

20. The method of claim 18 wherein the first machine learning model comprises a Contrastive Language-Image Pre-training (CLIP) model and the second machine learning model comprises a Visual Question Answering (VQA) model.

* * * * *